United States Patent [19]

Sepp et al.

[11] 4,446,558
[45] May 1, 1984

[54] $CO_2$ LASER WAVE GUIDE

[75] Inventors: Gunther Sepp, Ottobrunn; Peter Dyrna, Haar, both of Fed. Rep. of Germany

[73] Assignee: Messerschmitt-Boelkow-Blohm Gesellschaft mit beschraenkter Haftung, Munich, Fed. Rep. of Germany

[21] Appl. No.: 319,706

[22] Filed: Nov. 9, 1981

[30] Foreign Application Priority Data

Nov. 19, 1980 [DE] Fed. Rep. of Germany ....... 3043574

[51] Int. Cl.$^3$ .............................................. H01S 3/02
[52] U.S. Cl. ........................................ 372/64; 372/87
[58] Field of Search ....................... 372/64, 65, 61, 87

[56] References Cited

U.S. PATENT DOCUMENTS 3,683,300  8/1972  Hohenstein ........................ 372/65

*Primary Examiner*—James W. Davie
*Attorney, Agent, or Firm*—W. G. Fasse; D. H. Kane, Jr.

[57] ABSTRACT

A $CO_2$ laser wave guide, which is excitable by a high frequency signal, has two boron nitride bodies (11a, 11b; 111a, 111b) which are held in position in a housing (10) by a specially shaped spring (14, 114) which presses the boron nitride bodies against the inner surface (10a) of the housing for good heat transfer and dissipation. A spacer (18) holds the boron nitride bodies apart to provide a gap (15) in which one electrode is held. The specially shaped spring operates, in addition to holding the boron nitride bodies in place, as the opposite electrode. This structure requires few parts and these parts do not have to meet high tolerance requirements, nor is it necessary to provide a high surface finish for the individual components.

12 Claims, 4 Drawing Figures

CO₂ LASER WAVE GUIDE

CROSS-REFERENCE TO RELATED APPLICATION

The present application is based on the corresponding German Patent Application No. P 3,043,574.6 filed in the Federal Republic of Germany on Nov. 19, 1980. The priority of the German filing date is claimed for the present application.

BACKGROUND OF THE INVENTION

The present invention relates to a $CO_2$ laser wave guide which is excitable by a high frequency signal. The components of such a wave guide may be assembled in a metal jacket, for example, having an annular or rather tubular cross-sectional configuration.

Wave guide lasers are known in the art in a multitude of constructions. It is an essential requirement of all prior art wave guide laser types that all surfaces of all components must be exactly parallel to one another and must have the highest quality surface finish in order to assure, for example, a good heat dissipation between the electrodes and the wave guide material, or rather between the heat generating components and the outer jacket or housing of the structure. The capillary duct itself requires the maintaining of the narrowest or most stringent tolerances. Thus, the manufacture of such lasers requires a rather expensive machining and finishing operation as well as a large number of structural components each requiring the finest finishing operations. Accordingly, such lasers are rather expensive and the possibilities of using such lasers are respectively limited.

OBJECTS OF THE INVENTION

In view of the foregoing it is the aim of the invention to achieve the following objects singly or in combination.

to construct a wave guide laser excitable by a high frequency signal which is substantially simplified in its structure and layout as compared to the prior art;

to provide a wave guide laser the components of which do not have to meet narrow tolerance requirements without adversely affecting the output capacity of such lasers;

to substantially reduce the costs for manufacturing such lasers; and to assure a highly efficient heat dissipation or heat transfer between the heat generating components and the heat discharging components of the laser structure.

SUMMARY OF THE INVENTION

According to the invention the above objects have been achieved in a $CO_2$ laser wave guide which is excitable by a high frequency signal and the components of which are assembled in a tubular metal jacket or housing. A body of boron nitride is shaped to conform with its outer surface to the inner surface of the metal housing and occupies approximately one half of the space in the metal housing. The boron nitride body is provided with a gap or it comprises two body portions forming such a gap in which the main electrode of the laser wave guide is held. The opposite electrode is formed to contact with its outwardly facing surface, the inner surface of the housing, and to operatively support the boron nitride body on its inwardly facing surface. This type of structure provides an optimal surface contact between the metal housing, the boron nitride body or body portions, and the respectively shaped counter electrode. In a structure in which the wave guide comprises a plurality of quartz spacer rods, which assure a structural stability, the boron nitride body may be provided with respective recesses in which the quartz rods are located and one or several quartz rods may extend longitudinally through the counter electrode.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE PRESENT INVENTION

Figure 1:
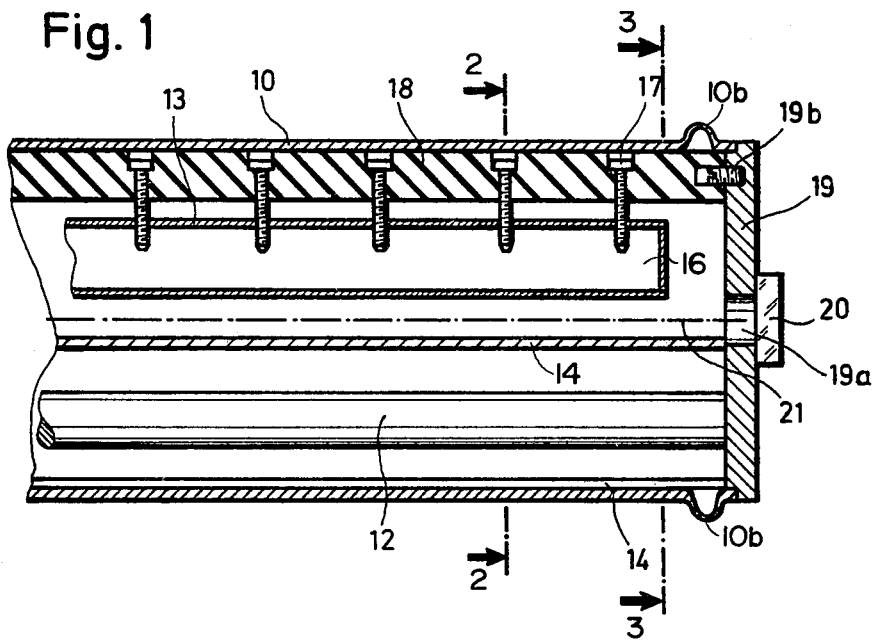
FIG. 1 is a longitudinal sectional view through one embodiment of a $CO_2$ laser wave guide according to the invention.

FIG. 1 shows a longitudinal, sectional view through a $CO_2$ wave guide laser according to the invention comprising an outer metal housing 10 provided with a bellows type pleat 10b or pleats which provide the metal jacket or housing 10 with a certain elasticity for compensating heat expansions. Each end of the housing 10 is closed by a cover 19 provided with a central bore 19a which in turn is covered by a laser mirror 20 positioned for cooperation with a capillary duct 21 operatively located coaxially with the longitudinal axis of the wave guide. Each cover 19 is held in place by conventional welding or brazing to the metal housing 10. The covers 19 also hold in the embodiment shown in FIGS. 1 and 2 the insulating spacer member 18 by coventional screw means 19b and three spacer rods 12 made of quartz and arranged to provide a structural stability of the resonator. The covers 19 hold the spacer rods 12 in a proper position relative to one another and relative to the other components of the laser wave guide structure.

Figure 2:
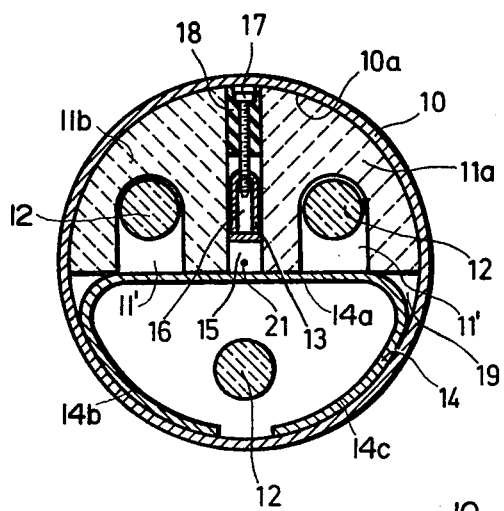
FIG. 2 is a sectional view along section line 2—2 in FIG. 1.

As best seen in FIG. 2, according to the invention there is provided a di-electric body means in the form of two longitudinally extending body portions 11a and 11b made of boron nitride. These body portions 11a and 11b are constructed mirror-symmetrically relative to each other and are spaced from each other by a spacer member 18 to provide a gap 15 between the body portions 11a and 11b in which the main electrode 13 is operatively held in position, preferably by additional mounting means such as a plurality of threaded bolts 17 extending through the spacer member 18 into the main electrode 13 which is hollow as shown at 16. The body portions 11a and 11b extend along the entire length of the housing or jacket 10 between the covers 19. The radially outwardly facing surface areas of the bodies 11a and 11b are held in intimate surface contact with the inwardly facing surface 10a of the jacket 10. This provides a good heat dissipating contact. As mentioned, the spacer member 18 functions as a holding rail or mounting means for the first or primary electrode 13. Additionally, the radially outer surface of the spacer rail (18) is also in intimate contact with the inner surface 10a of the housing 10 for heat dissipation.

A second electrode 14 functions as such and simultaneously operates as a means for holding the body portions 11a and 11b in the housing. For this purpose the electrode 14 has three portions. Namely a bridging portion 14a between two leg portions 14b and 14c. These leg portions 14b and 14c are curved to provide an intimate heat transferring contact between these leg portions and the inner surface 10a of the housing 10. The connection of the electrodes to the power supply are made by conventional means and are not shown in the FIGS. as well as the gas filling inlet.

Prior to insertion of the enumerated components the first electrode 13 is adjusted in its spacing relative to the capillary duct 21 and relative to the second electrode 14 by means of the mounting threaded bolts 17. It will be appreciated, that the mounting of the electrode 13 does not necessarily have to be accomplished with the described mounting and adjusting bolts 17. For example, the electrodes 13 could be provided with mounting projections which reach into respective recesses in the body portions 11a and 11b of boron nitride. These body portions clamp the electrode 13 in the gap 15 anyway due to the biasing elasticity of the hollow electrode 13.

Such biasing elasticity or spring characteristic of the electrode 13 and also of the supporting electrode 14 is accomplished by making both electrodes of spring bronze and by providing the illustrated shape for these electrodes so that the surfaces of the springs bear against the respective counter surfaces. Due to the spring characteristic of the electrode legs 14b and 14c, the bridging portion 14a of the electrode 14 will press the body portions 11a and 11b into the above mentioned heat transferring contact with the inner surface 10a of the jacket 10. Additionally, transfer is accomplished between legs 14b and 14c and the housing 10 for good heat dissipation.

Figure 4:
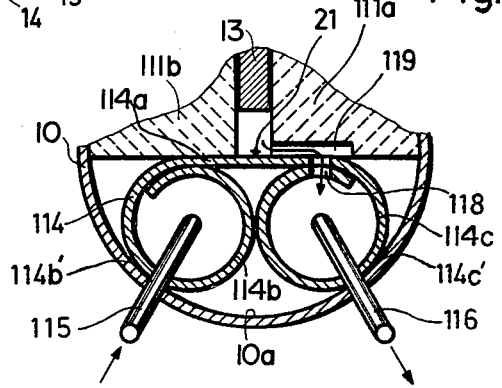
FIGS. 3 and 4 are sectional views similar to that of FIG. 2, however, showing a modified embodiment of the $CO_2$ wave guide laser according to the invention. The sectional views are taken along section line 3—3 in FIG. 1 at one end of the main electrode and at the corresponding section line at the other end of the main electrode.
Figure 3:
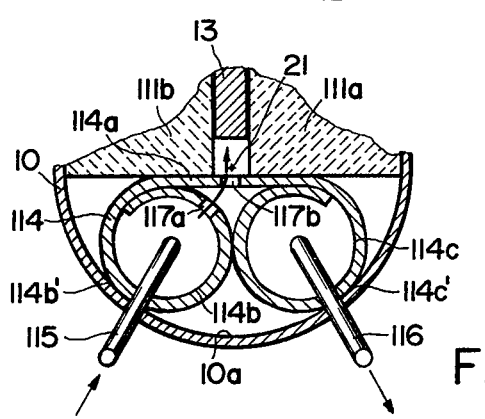

FIGS. 3 and 4 show an embodiment similar to that of FIGS. 1 and 2, however, the second electrode 114 is shaped differently in the embodiment of FIGS. 3 and 4. Thus, the electrode 114 which is also made of spring bronze has a bridging portion 114a in heat transfer contact with the dielectric bodies 111a and 111b of boron nitride. The bridging portion 114a interconnects two leg portions 114b and 114c formed into substantially circular channels which bear against the inner surface 10a of the housing 10 along contact zones 114b' and 114c', whereby again the above mentioned spring characteristics of the two electrodes 13 and 114 assure that all the components are pressed radially outwardly into heat transfer contact with the metal housing or jacket 10. Although a larger heat transfer surface area is provided between the legs 14b and 14c and the housing in FIG. 2, however, in FIG. 3 the space provided by the channels 114b and 114c is especially suitable for connection to gas supply and gas discharge conduits 115 and 116. In this embodiment gas passageways 117a and 117b, 118, and 119 are provided for connecting one gas supply conduit, for example, 115 to one end of the capillary duct 21 and for connecting the other gas conduit for example, 116 to the other end of the capillary duct 21. The gas passageway 119 may, for example, be milled into the respective boron nitride body portion 111a or 111b.

As shown in FIGS. 3 and 4 the two leg portions 114b and 114c of the spring electrode 114 have respectively inwardly curling end portions which contact each other, thereby tending to support each other and simultaneously press the leg portions 114b and 114c into firm contacts along the contact zones 114b' and 114c'. This type of structure achieves an optimal, symmetrical distribution of the biasing forces within the entire assembly thereby uniformly pressing the body portions 111a and 111b against the inner surface of the housing 10.

Stabilizing quartz spacer rods are not employed in the embodiment of FIGS. 3 and 4. However, if desired, such rods may be installed also in the embodiment of FIGS. 3 and 4.

The structure according to the invention has a number of important advantages. Primarily it is now possible to substantially reduce the number of individual components for the wave guide laser. Further, the tolerance range for the dimensions of each individual component is now substantially larger than the respective tolerance range in prior art components of a $CO_2$ wave guide laser. Further, a good heat transfer characteristic and dissipation is assured in both embodiments although this particular feature is even better in the embodiment of FIG. 2. In any event, the heat transfer is accomplished through the body portions 11a and 11b, 111a, 111b and through the electrodes 13, 14, and 114 made of spring bronze, as well as through the mounting means 17 and 18 also contacting the housing 10. The spring biasing assures a good heat transfer contact under all operating conditions.

Although the invention has been described with reference to specific example embodiments, it will be appreciated, that it is intended, to cover all modifications and equivalents within the scope of the appended claims.

What is claimed is:

1. In a $CO_2$ laser a wave guide, comprising a longitudinal metal housing (10) having a housing wall with an inner surface (10a), first and second electrodes operatively supported (13, 14; 114) inside said housing opposite each other for defining a wave guide duct between said first and second electrodes, a boron nitride body (11a, 11b; 111a, 111b) located inside said housing (10), said body having a gap (15) therein for holding said first electrode (13) inside said gap (15), said second electrode having a shape forming three portions, one electrode portion resting against said boron nitride body and two electrode portions resting against said inner housing surface for holding said boron nitride body also against said inner surface of said housing wall, whereby the boron nitride body and said second electrode mutually support each other in said housing and said first electrode (13) is substantially supported in said gap (15) of the boron nitride body, and capillary duct means (21) operatively arranged in said waveguide duct.

2. The wave guide of claim 1, wherein said housing has a circular cross-section, said shape of said second electrode forming with its three portions substantially a semicircle, said boron nitride body having two body elements each having approximately a quarter circular cross-section, said two body elements resting on said semi-circle, and spacer means (18) between said two body elements for forming said gap and holding said first electrode inside said gap.

3. The wave guide of claim 1 or 2, wherein the first and second electrode are made of spring bronze for spring biasing said boron nitride body and said first and second electrode means into position in said housing.

4. The wave guide of claim 2, wherein said spacer means (18) are located to contact the inner surface of said housing wall, said wave guide further comprising mounting means (17) for securing said first electrode to said spacer means in said gap (15).

5. The wave guide of claim 1, further comprising a plurality of longitudinal quartz rods for providing a longitudinal stability of the wave guide, said boron nitride body having recesses (11') in which a respective one of said quartz rods is received.

6. The wave guide of claim 5, wherein at least one of said longitudinal quartz rods extends longitudinally through said second electrode means (14).

7. The wave guide of claim 1 or 2, wherein said laser capillary duct means (21) is operatively arranged substantially centrally in said wave guide duct between said first and second electrodes.

8. The wave guide of claim 7, wherein said capillary duct means are made substantially of alumina ($AL_2O_3$).

9. The wave guide of claim 7, wherein said capillary duct means are made substantially of beryllia (BeO).

10. The wave guide of claim 1 or 2, wherein said second electrode portions of the shape of said second electrode comprise two substantially tubular channels (114b, 114c) and a bridging portion (114a) operatively interconnecting said tubular channels, said wave guide further comprising gas inlet and outlet ducts (115, 116) operatively connected to the inner side of said tubular channels.

11. The wave guide of claim 10, further comprising gas passageways (117a, 117b, 118, 119) from said tubular channels (114b, 114c), laser capillary duct means in said gap, said passageways operatively connecting one end of said laser capillary duct means to one of said tubular channels and the other end of said laser capillary duct means to the other of said tubular channels.

12. The wave guide of claim 10, wherein said bridging portion (114a) of said second electrode rests against said boron nitride body, and wherein said tubular channels of said second electrode rest against said inner surface of the housing substantially along a line contact, whereby the mutual support between the boron nitride body and the second electrode results in an optimal force distribution inside said housing.

* * * * *